US012317333B2

United States Patent
Yu et al.

(10) Patent No.: US 12,317,333 B2
(45) Date of Patent: May 27, 2025

(54) DEVICE AND METHOD FOR CONTROLLING TRANSMISSION OF ELECTRONIC DEVICE

(71) Applicant: Samsung Electronics Co., Ltd., Suwon-si (KR)

(72) Inventors: Hyungjoon Yu, Suwon-si (KR); Seungbum Ju, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 218 days.

(21) Appl. No.: 18/066,388

(22) Filed: Dec. 15, 2022

(65) Prior Publication Data

US 2023/0115106 A1 Apr. 13, 2023

Related U.S. Application Data

(63) Continuation of application No. 17/042,831, filed as application No. PCT/KR2019/003081 on Mar. 18, 2019, now Pat. No. 11,540,328.

(30) Foreign Application Priority Data

Mar. 27, 2018 (KR) .................. 10-2018-0034897

(51) Int. Cl.
*H04W 74/0833* (2024.01)
*H04B 1/04* (2006.01)
(Continued)

(52) U.S. Cl.
CPC ...... *H04W 74/0833* (2013.01); *H04B 1/0458* (2013.01); *H04B 7/0404* (2013.01); *H04B 7/0602* (2013.01)

(58) Field of Classification Search
CPC .......... H04W 74/0833; H04W 52/346; H04W 52/44; H04W 52/48; H04B 1/0458;
(Continued)

(56) References Cited

U.S. PATENT DOCUMENTS 6,763,195 B1 7/2004 Willebrand et al.
10,142,943 B2 * 11/2018 Kumar .................. H03F 1/0227
(Continued)

FOREIGN PATENT DOCUMENTS

CN 1669247 A 9/2005
CN 105379395 A 3/2016
(Continued)

OTHER PUBLICATIONS

International Search Report and Written Opinion of the International Searching Authority in connection with International Application No. PCT/KR2019/003081 dated Jun. 20, 2019, 11 pages.
(Continued)

*Primary Examiner* — Nizam U Ahmed

(57) ABSTRACT

An electronic device according to various embodiments of the present invention may comprise a transmission module including a first transmission module and a second transmission module, and a processor. The processor may feedback-receive a transmission power of the first transmission module, calculate a difference value between a target transmission power and the transmission power of the first transmission module, determine a state of the first transmission module on the basis of the difference value, and turn off a transmission operation of the first transmission module and activate a transmission operation of the second transmission module in accordance with the determination that the state of the first transmission module is abnormal. Various other embodiments are possible.

20 Claims, 10 Drawing Sheets

(51) Int. Cl.
*H04B 7/0404* (2017.01)
*H04B 7/06* (2006.01)

(58) Field of Classification Search
CPC .. H04B 7/0404; H04B 7/0602; H04B 1/0466; H04B 1/0483; H04B 17/102; H04B 17/14; H04B 17/11
See application file for complete search history.

(56) References Cited

U.S. PATENT DOCUMENTS

| | | |
|---|---|---|
| 2008/0151798 A1 | 6/2008 | Camp |
| 2013/0225223 A1 | 8/2013 | Nukala et al. |
| 2014/0362744 A1 | 12/2014 | Yan et al. |
| 2015/0094003 A1 | 4/2015 | Ramkumar et al. |
| 2015/0282496 A1 | 10/2015 | Peters et al. |
| 2016/0128004 A1 | 5/2016 | Lee et al. |
| 2017/0054470 A1 | 2/2017 | Reza et al. |
| 2017/0244456 A1 | 8/2017 | Kim et al. |
| 2017/0353955 A1* | 12/2017 | Hsu .................. H04W 72/0453 |
| 2018/0121381 A1* | 5/2018 | Podsiadlo ............ G06F 13/404 |
| 2018/0176961 A1 | 6/2018 | Babaei et al. |
| 2019/0174433 A1* | 6/2019 | Nory .................. H04W 52/146 |

FOREIGN PATENT DOCUMENTS

| | | |
|---|---|---|
| EP | 2828985 A1 | 1/2015 |
| KR | 10-2013-0134256 A | 12/2013 |
| KR | 10-2015-0012705 A | 2/2015 |
| KR | 10-2016-0019102 A | 2/2016 |
| KR | 10-2016-0029014 A | 3/2016 |
| KR | 10-2017-0098109 A | 8/2017 |
| WO | 10-2013-177077 A1 | 11/2013 |
| WO | 2017082945 A1 | 5/2017 |

OTHER PUBLICATIONS

Supplementary European Search Report dated Mar. 30, 2021, in connection with European Patent Application No. EP19777943.2, 8 pages.
The First Office Action dated Sep. 28, 2021, in connection with Chinese Application No. 201980022787.2, 18 pages.
"Notice of Preliminary Rejection," dated Mar. 3, 2022, in connection with Korean Patent Application No. 10-2018-0034897, 11 pages.
Notice of Patent Grant dated Aug. 30, 2022 in connection with Korean Patent Application No. 10-2018-0034897, 3 pages.

* cited by examiner

DEVICE AND METHOD FOR CONTROLLING TRANSMISSION OF ELECTRONIC DEVICE

CROSS-REFERENCE TO RELATED APPLICATIONS

This application is a continuation of application Ser. No. 17/042,831, now U.S. Pat. No. 11,540,328, which is the 371 National Stage of International Application No. PCT/KR2019/003081, filed Mar. 18, 2019, which claims priority to Korean Patent Application No. 10-2018-0034897, filed Mar. 27, 2018, the disclosures of which are herein incorporated by reference in their entirety.

BACKGROUND

1. Field

The disclosure relates to an apparatus and a method for controlling transmission of an electronic device having at least two transmission modules.

2. Description of the Related Art

Electronic devices may include wireless communication modules. The electronic devices may transmit data to a base station and/or other electronic devices, and may receive data transmitted from a base station and/or other electronic devices through the wireless communication module. The wireless communication module of the electronic device may include a plurality of transmission modules and/or reception modules. For example, inter-band uplink carrier aggregation (ULCA) has been proposed in 3GPP LTE release-12. Conventional electronic devices have used one transmission path, but an electronic device supporting inter-band CA may support 2 ULs/2 DLs CAs by aggregation of two carriers.

Among the communication errors of electronic devices, errors in the transmission path (Tx path) may be caused by failures of power amplifier (PA), switch, filter, radio frequency IC (RFIC), and phase locked loop (PLL), or the like.

SUMMARY

An electronic device including a plurality of Tx modules may require a configuration and algorithm to identify errors (failures, defects) of the Tx RF path and to control the wireless transmission path in which the error occurs. In addition, it may be necessary to store the information of the band and component in which the error occurred, and to reconfigure the wireless path, based on the band and component in which the error occurred in the Tx module when the electronic device performs re-work.

When an electronic device having an antenna switching algorithm includes a plurality of Tx modules, it may be necessary to select a different Tx path and perform a Tx operation when an error occurs in a specific Tx path in consideration of Tx path error information.

An electronic device according to various embodiments may include a plurality of Tx modules, and may provide an apparatus and method for performing a Tx operation by storing an error state of a band and component of a corresponding Tx module and activating another Tx module in a normal state when an error of an operating Tx module is identified.

An electronic device according to various embodiments may include a plurality of Tx modules, and may provide an apparatus and method for storing and/or transmitting to a server by identifying the error state of the band and components in which the error has occurred, when an error of the Tx module is identified.

An electronic device according to various embodiments may include a plurality of Tx modules, and may provide an apparatus and method for identifying an error of a Tx module, based on at least one of transmission power of an operating Tx module, response information of a random access channel, and/or operation states of components of a transmission module.

Solution to Problem

According to various embodiments, an electronic device may include a transmission module including a first transmission module and a second transmission module, and a processor. The processor is configured to: receive feedback of a transmission power of the first transmission module; calculate a difference value between a target transmission power and the transmission power of the first transmission module; store the state of the first transmission module as an abnormal state, based on the difference value and turn off the transmission operation; and activate the transmission operation of the second transmission module.

According to various embodiments, an electronic device may include a housing, a first antenna located inside the housing or being a part of the housing, a second antenna located inside the housing or being a part of the housing, a first transceiver electrically connected to the first antenna, a second transceiver electrically connected to the second antenna, and a control circuit operatively connected to the first transceiver and the second transceiver. The control circuit may be configured to: transmit a first signal using the first transceiver and the second transceiver to a first network using carrier aggregation as a first operation; transmit a first signal using the first transceiver to a first network; measure a transmission strength of the first signal using the first transceiver; and transmit a second signal using the second transceiver to the first network while the first transceiver is deactivated, based at least on part on the measured transmission strength, as a second operation.

According to various embodiments, an electronic device may include a housing, a first antenna located inside the housing or being a part of the housing, a second antenna located inside the housing or being a part of the housing, a first transceiver electrically connected to the first antenna, a second transceiver electrically connected to the second antenna, and a control circuit operatively connected to the first transceiver and the second transceiver. The control circuit may transmit a first signal using the first transceiver and the second transceiver to a first network using carrier aggregation as a first operation, transmit a first signal using the first transceiver to the first network, determine whether a response is received from the first network, and transmit a second signal using the second transceiver to the first network, based on the determination as to whether to receive the response, as a second operation.

According to various embodiments, a method for controlling transmission of an electronic device may include: activating a transmission operation of a first transmission module in a transmission module including the first transmission module and a second transmission module; receiving feedback of a first transmission power of the first transmission module; calculating a difference value between a target transmission power and an actual transmission power of the first transmission module; storing the first transmission module to be abnormal if the calculated difference value of two power exceeds a reference value; and activating the transmission operation of the second transmission module.

According to various embodiments, a method for controlling transmission of an electronic device supporting inter-band uplink carrier aggregation (ULCA) may include: activating the transmission operations of a first transmission module and a second transmission module; identifying a transmission error of the first transmission module and the second transmission module; and determining the transmission module in which the transmission error has occurred as an error transmission module and turning off the operation of the error transmission module. The operation of identifying the transmission error may include: identifying a random access channel (RACH) response error of the transmission module; calculating a difference value between a target transmission power and an actual transmission power if the RACH response error is identified; and determining the transmission module as an error transmission module if the calculated difference value exceeds a reference value.

When an error in the Tx RF path occurs in an electronic device having at least two Tx RF paths according to various embodiments, the use of the Tx RF path in which an error has occurred can be stopped, the signal can be transmitted through another Tx RF path, and Tx transmission errors due to errors in Tx components can be prevented. Alternatively, the electronic device can detect the Tx RF path in which an error has occurred, store the RF damage information in the terminal, analyze the error state by reporting the terminal identification number, the band in which the error occurred, and the component information, and effectively perform a re-work operation.

DETAILED DESCRIPTION

Hereinafter, various embodiments of the document will be described with reference to the accompanying drawings.

Figure 1:
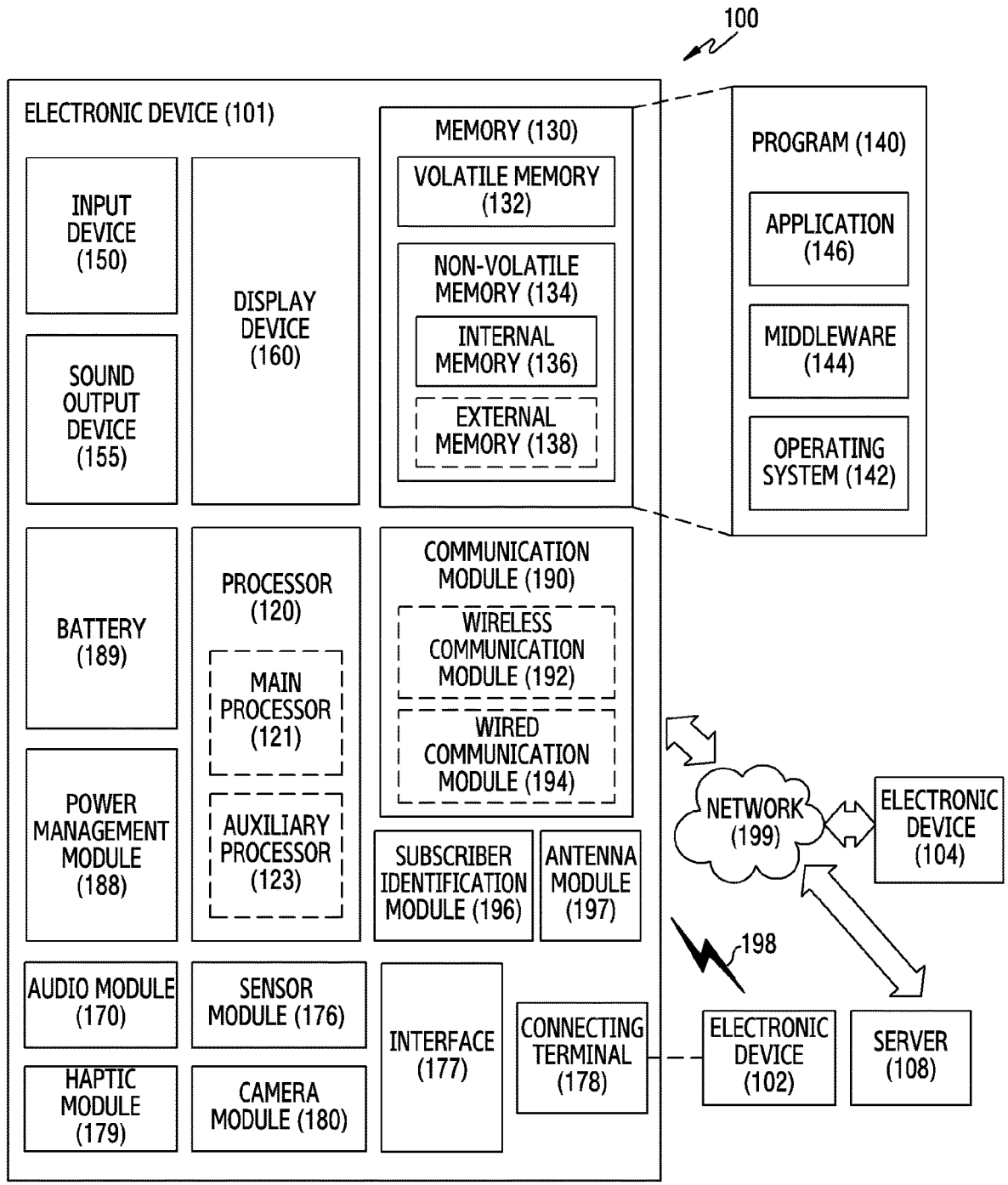
FIG. 1 is a block diagram of an electronic device (101) in a network environment (100), according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and in such a case, at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
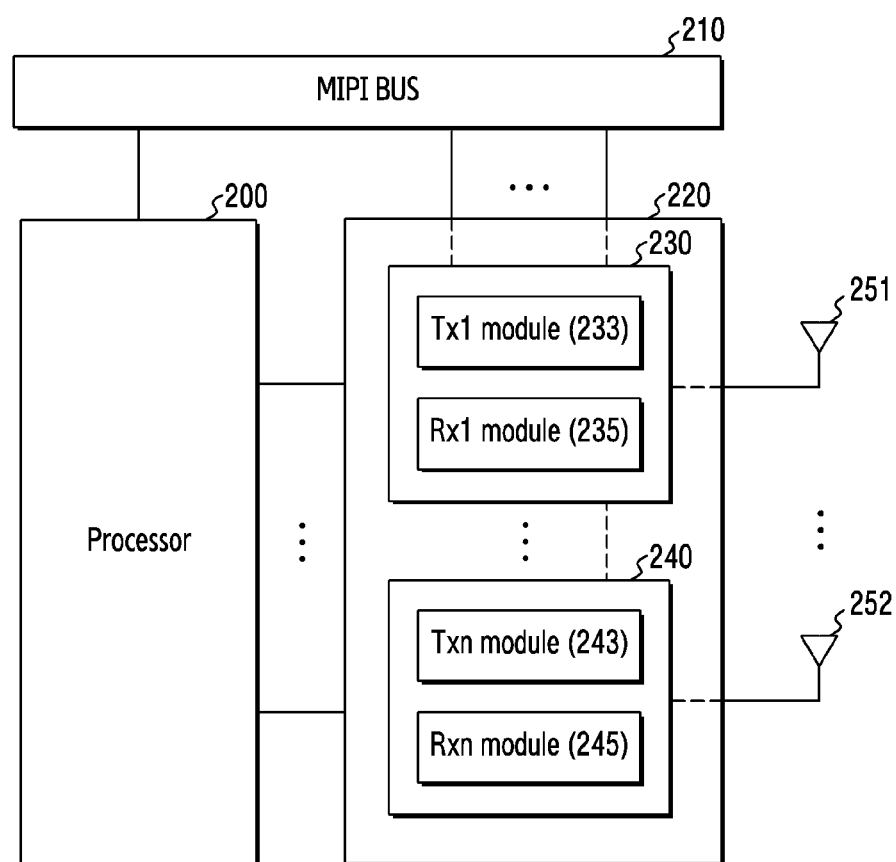
FIG. 2 is a diagram illustrating a configuration of an electronic device according to various embodiments.

FIG. 2 is a diagram illustrating a configuration of an electronic device according to various embodiments.

Referring to FIG. 2, the electronic device according to various embodiments (e.g., the electronic device 101 of FIG. 1) may include a processor 200 and a Tx/Rx module (or, transceiver) 220. The processor 200 may be a communication processor. The Tx/Rx module (or transceiver) 220 may include a first Tx/Rx module (Tx1/Rx1 module) 230 to an $n^{th}$ Tx/Rx module (Txn/Rxn module) 240. Each of the first Tx/Rx module (Tx1/Rx1 module) 230 to an $n^{th}$ Tx/Rx module (Txn/Rxn module) 240 may include Tx1 module 233 to Txn module 243 and Rx1 module 235 to Rxn module 245. Each component of the processor 200 and the Tx/Rx module 220 (e.g., Tx1 module 233 to Txn module 243 and Rx1 module 235 to Rxn module 245) may be connected through a mobile industry processor interface (MIPI) bus 210. The first to $n^{th}$ antennas 251 to 252 may be located inside the housing of the electronic device or may be formed as a part of the housing. The first antenna 251 may be electrically connected to the first Tx/Rx module 230 (or the first transceiver). The $n^{th}$ antenna 252 may be electrically connected to the $n^{th}$ Tx/Rx module 240 (or the $n^{th}$ transceiver). The first antenna 251 to the $n^{th}$ antenna 252 may propagate the radio signal output from the corresponding Tx module to external devices or receive a radio signal propagated from the external devices and apply it to the corresponding Rx module.

According to various embodiments, the Tx/Rx module 220 may be included in the wireless communication module 192 of FIG. 1. The wireless communication module 192 may include Tx modules (Tx1 module 233 to Txn module 243) and Rx modules (Rx1 module 235 to Rxn module 245). For example, the Tx/Rx module 220 may be a cellular communication module. The Tx1 module 233 to the Txn module 243 may include a frequency up converter, a filter, a power amplifier (PA), and the like, and may transmit an RF signal to the uplink. The Rx1 module 235 to the Rxn module 245 may include a frequency down converter, a filter, a low noise amplifier (LNA), and the like, and may receive a downlink RF signal.

According to various embodiments, the processor 200 may be a communication processor (CP) (e.g., the auxiliary processor 123 of the processor 120 of FIG. 1). The processor 200 may include a modem, generate uplink channel data and output the same to the Tx1 module 233 to the Txn module 243, and demodulate downlink channel signals received through the Rx1 module 235 to the Rxn module 245. The processor 200 may identify errors in the Tx1 module 233 to the Txn module 243 in operation. When the error of the Tx module in operation is identified, the processor 220 may turn off the Tx module in which the error has occurred, and activate the operation of another Tx module in a normal state. The processor 200 may identify the components (e.g., PA, switch, RFIC, phase lock loop (PLL), etc.) in which an error (e.g., failure, breakage, etc.) occurred in the Tx module in which the error occurred, and store the identified information of the components. When communicating with a server, the processor 200 may transmit identification information of an electronic device and information of a component in which an error has occurred.

In various embodiments, the processor 200 (or a control circuit) may perform a first operation and a second operation. The first operation of the processor 200 (or a control circuit) may be an operation of transmitting a first signal using a first transceiver and a second transceiver to the first network using carrier aggregation. The second operation may be performed based on a transmission strength transmitted through the transceiver and/or a response result received through the transceiver. According to an embodiment, the second operation may be an operation of transmitting the first signal using the first transceiver to the first network, measuring the transmission strength of the first signal using the first transceiver, and transmitting the second signal using the second transceiver to the first network while the first transceiver is deactivated, based at least in part on the measured transmission strength. According to an embodiment, the second operation may be an operation of transmitting the first signal using the first transceiver to the first network, determining whether a response is received from the first network, and transmitting the second signal using the second transceiver to the first network in response to the determination.

In various embodiments, carrier aggregation (CA) may aggregate multi-band carriers. As the carrier aggregation (CA), an intra-band contiguous CA (CA) method of adjacent frequencies within one band, an intra-band non-contiguous CA (CA) method of frequencies that are not adjacent within the same band, and an inter-band CA method of different band frequencies may be used. The processor 200 (or control circuit) may transmit the carrier-aggregated first signal to the network using the Tx/Rx module 230 (or the first transceiver) and/or the Tx/Rx module 240 (or the second transceiver).

Figure 3:
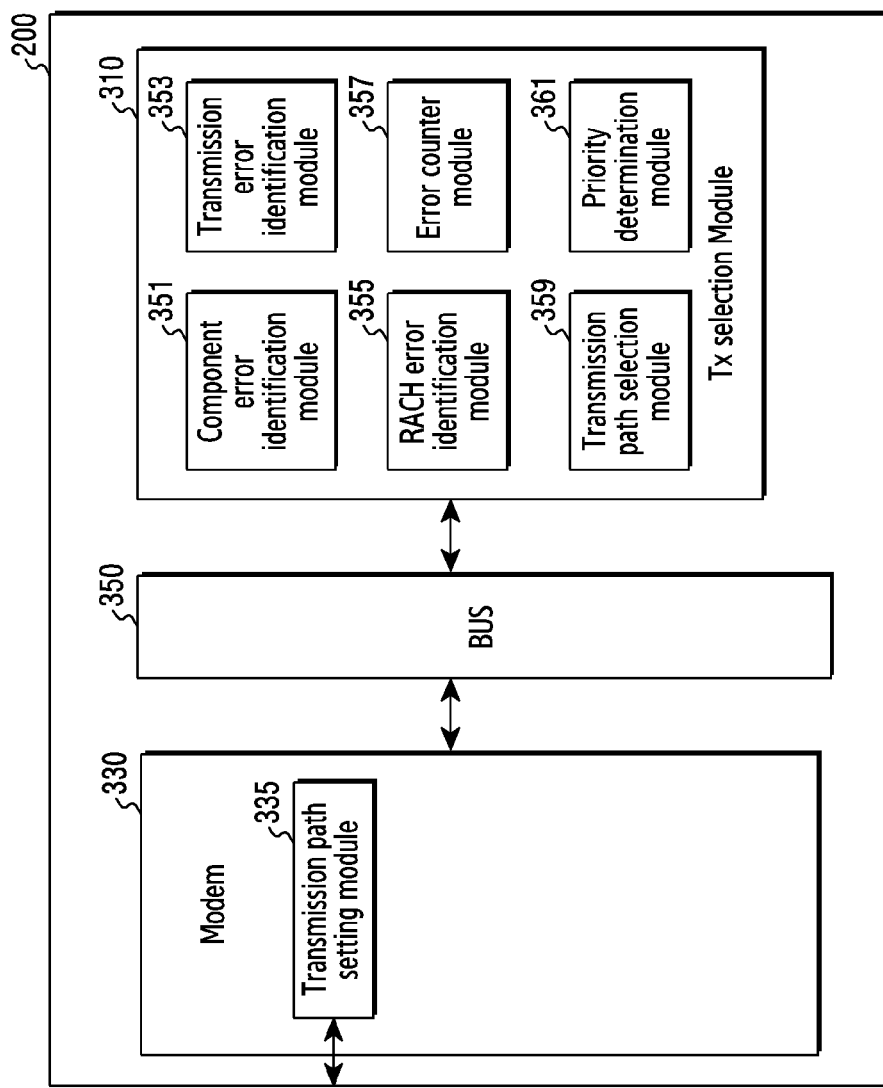
FIG. 3 is a diagram illustrating a configuration of a processor of an electronic device according to various embodiments.

FIG. 3 is a diagram illustrating a configuration of a processor of an electronic device according to various embodiments. FIG. 3 may be a configuration of, for example, the processor 200 of FIG. 2.

Referring to FIG. 3, the processor 200 may include a transmission (Tx) selection module 310, a digital signal processor (DSP), a modem module 330, and a bus 350. The transmission selection module 310, the DSP, and the modem 330 may be connected through the bus 350. The Tx selection module 310 may include a transmission error identification module 353, a component error identification module 351, a random access channel (RACH) error identification module 355, an error counter module 357, a transmission path selection module 359, and a priority determination module 361. The modem 330 may include a transmission path setting module 335. According to various embodiments, the transmission error identification module 353, the component error identification module 351, the RACH error identification module 355, the error counter module 357, the transmission path selection module 359, the priority determination module 361, and the transmission path setting module 335 may be configured as a software module.

According to various embodiments, the modem module 330 may include uplink channel transmission modules and downlink channel reception modules of an electronic device (e.g., the electronic device 101 of FIG. 1). The uplink channel transmission modules of the modem module 330 may include a modulator, and the downlink channel reception modules may include a demodulator. For example, the modulator and demodulator may be a long term evolution (LTE) modulator and demodulator.

According to various embodiments, the uplink channel transmission module of the modem module 330 may include a RACH transmission module. The RACH transmission module may be a channel through which an electronic device transmits a response message to a network or a request message to a network (uplink common channel). For example, the electronic device may transmit data requesting a network (e.g., eNode B) channel (e.g., a data channel) through the RACH. When the electronic device transmits the request message to the network, the network may transmit the RACH response message through the downlink control channel. The electronic device may receive a response message transmitted from the network through the downlink channel reception module of the modem module 330.

According to various embodiments, the transmission path setting module 335 of the modem module 330 may select a transmission path. For example, the transmission path setting module 335 may be connected to an MIPI bus (e.g., the MIPI bus 210 of FIG. 2). The transmission path setting module 335 may configure the operation Tx module of the Tx/Rx module (e.g., the Tx/Rx module 220 of FIG. 2) through the MIPI bus, and transmit the uplink channel data to the configured Tx/Rx module.

According to various embodiments, the transmission selection module 310 may analyze whether an error has occurred in the operating Tx module (e.g., the Tx1 module 233 in FIG. 2) of the Tx/Rx module, and may store error information of an operating Tx module and activate an operation of another Tx module (e.g., the Txn module 243 of FIG. 2) when an error is identified. The error information may be information on a use band of a Tx module in which a RACH error has occurred or an element (e.g., an RFIC of a Tx module, a power amplifier, etc.) in which an error has occurred in the Tx module.

According to various embodiments, the transmission error identification module (FBRx comparator) 353 may identify a transmission power error by comparing a target TX power and actual transmitted power. For example, the actual transmission power may be a signal (feedback RX (FBRx)) for inputting feedback to the output of the operating Tx module. If the difference between the actual transmission power and the target transmission power has a value greater than a configured value, the transmission error identification module 353 may identify as a transmission error. The component error identification module (mobile industry processor interface (MIPI) check) 351 may request a response of the unique slave ID (USID) of each component of the Tx module received through the MIPI bus (e.g., the MIPI bus 210 of FIG. 2) (read USID). If the correct response from the components is not identified, the component error identification module 351 may identify the component as an error (error of the component). For example, a device using the MIPI bus may include a manufacturer ID (MID), a product ID (PID), or USID. When receiving a register number (e.g., signals of (0x1 (channel), 0x3 (USID), 0x1e (PID)) storing the bus number, USID, PID, or MID through the MIPI bus, the device using the MIPI bus may output the pid value as a response. The RACH error identification module (RACH fail indicator) 355 may identify the RACH as a RACH error if response data of data transmitted through the RACH is not received within a configured time. The RACH error identification module (RACH fail indicator) 355 may identify a band in which a RACH error has occurred as an error band.

According to various embodiments, the error counter module (Tx Fail indicator) 357 may store the number of errors of an operating Tx module. The error counter module 357 may count the number of times of at least one error check among the transmission error identification module 353, the component error identification module 351, and the RACH error identification module 355, and if the counted value exceeds the configured reference value, the error counter module (Tx Fail indicator) 357 may identify as an error of the corresponding Tx module. For example, if the operating Tx module is the $m^{th}$ Tx path of the used band, the error counter module 357 may store the number of error checks in the $m^{th}$ Tx path of the used band.

According to various embodiments, a module (e.g., the Tx/Rx modules 230 and 240 of FIG. 2) may be composed of elements such as PAM and filters, and a path may be formed of various combinations of specific elements. For example, the Tx path may mean a path through which transmission data is transmitted through a modem, RFIC, power amplifier, or antenna. Thus, one module may form a plurality of paths.

According to various embodiments, when the number of error identifications stored in the error counter module 357 exceeds a configured reference value, the transmission path selection module 359 may store an error of an operating Tx module (e.g., an $m^{th}$ Tx path of a used band), select a Tx module of a high-priority band, and activate the same as an operation Tx module. For example, when the Tx module is composed of modules of Tx1 to Txn, m may have a value between 1 and n. Carriers may determine the priority of the Tx available band. For example, the priority band may be determined in the order of band 7, band 3, band 4, and the like. Here, the meaning of the lower number may be the order of the path configured as the Tx path. For example, Tx1 may be the highest path (primary path) of each band used in Stand-alone devices. The Tx1 of each band can guarantee performance when making a standalone call. The guarantee for the TX number performance may be weakened compared to tx1. For example, the transmission path selection module 359 may select a Tx module of a high-priority band (e.g., a band having the lowest number) among available bands for each band. The priority determination module 361 may store the priorities of the Tx modules. For example, the priority determination module 361 may store a band priority list that searches for priority for each operator. The priority determination module 361 may lower the priority so that the Tx path has the lowest priority when there is a Tx path in which an error (fail) exists compared with the Tx module selected for each priority. According to various embodiments, a priority table for each public land mobile network (PLMN) and a currently available Tx path may be referenced and stored as UE capability information. For example, if priority is configured in the order of band 2 and band 4, and band 2 cannot use Tx1 and band 4 can use Tx1, the priority determination module 361 may determine the priority in the order of band 4 and band 2.

According to various embodiments, the Tx path selected by the transmission selection module 310 is a Tx path to be used when a specific band is called by the modem 330 and may be provided through a bus.

According to various embodiments, the DSP may perform the interrupt function. The DSP may perform various functions of the electronic device, based on the memory of the processor 200 (e.g., the memory 130 of FIG. 1). For example, the transmission selection module 310 may be a core function of the DSP. The DSP may identify the operation error of the Tx module by embedding the transmission selection module 310 in the core, and control the transmission operation of the electronic device, based on the error confirmation. Alternatively, the DSP may control the operation of the transmission selection module 310 to identify the operation error of the Tx module, and control the transmission operation of the electronic device, based on the error confirmation.

Figure 4:
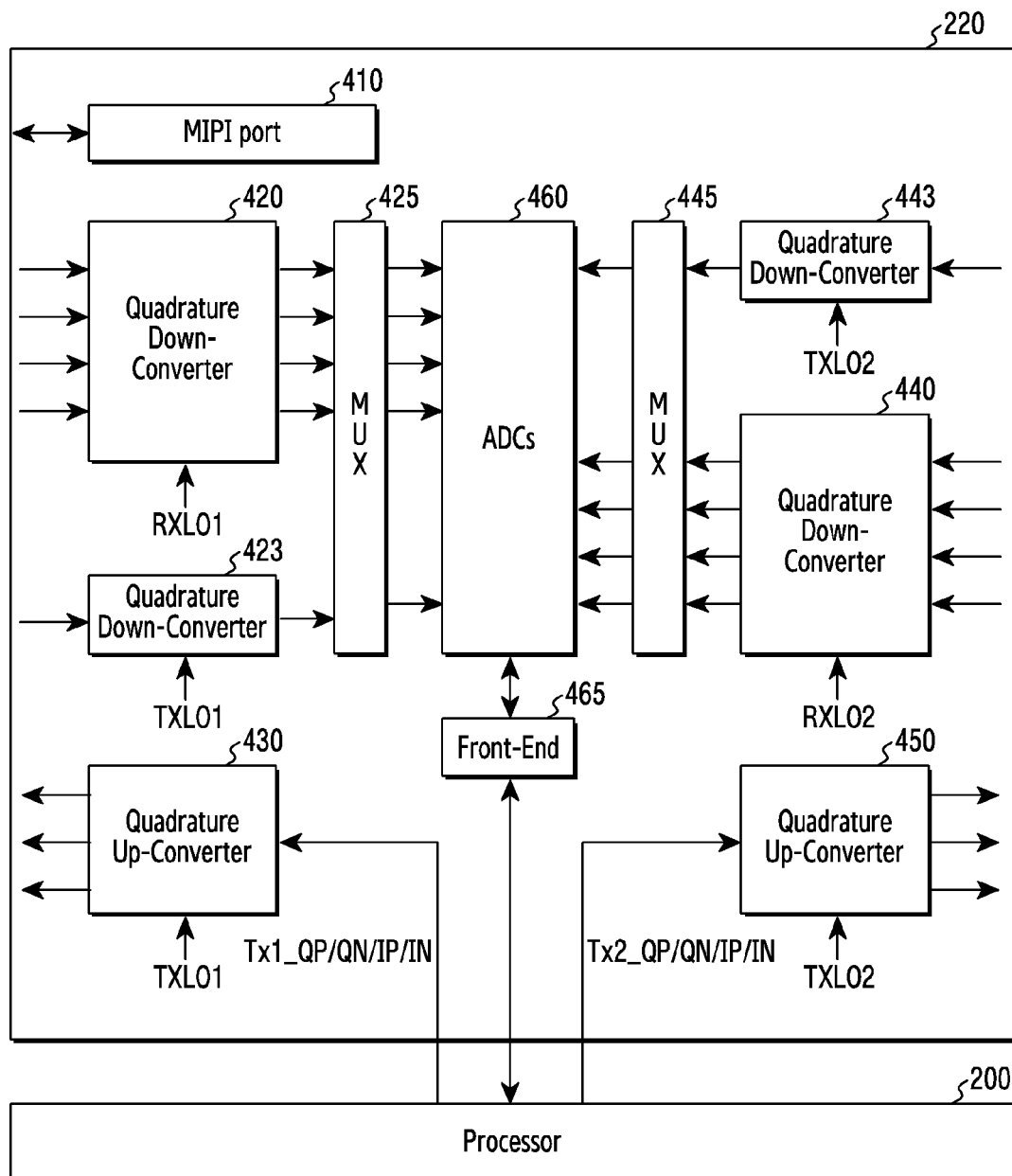
FIG. 4 is a diagram illustrating a configuration of a wireless communication module of an electronic device according to various embodiments.

FIG. 4 is a diagram illustrating a configuration of Tx/Rx module 220 of an electronic device according to various embodiments. For example, the configuration of FIG. 4 may be a configuration of the Tx/Rx module 220 of FIG. 2. The Tx/Rx module 220 may be a configuration when assuming that the Tx/Rx module 220 includes, for example, two communication modules.

Referring to FIG. 4, a bus interface 410 may receive an operation command from a processor 200, and may transmit operation responses (e.g., normal operation responses) of the components (e.g., RFIC, filter, amplifier) of the Tx/Rx module 220. For example, an MIPI bus interface (MIPI port) 410 may read the USIDs of the Tx/Rx modules 230 and 240 through an MIPI bus (e.g., the MIPI bus 210 of FIG. 2) at the request of the processor 200 in a normal operating state.

According to various embodiments, a first Rx module (e.g., the Rx1 module 235 of FIG. 2) of a first Tx/Rx module (e.g., the first Tx/Rx module 230 of FIG. 2) may include a first quadrature down converter 420, a second quadrature down converter 423, and a multiplexer (MUX) 425. A first Tx module (e.g., the Tx1 module 233 of FIG. 2) of the first Tx/Rx module may include a quadrature up converter 430. A first Rx module (e.g., the Rxn module 245 of FIG. 2) of a second Tx/Rx module (e.g., the $n^{th}$ Tx/Rx module 240 of FIG. 2) may include a first quadrature down converter 440, a second quadrature down converter 443, and a multiplexer 445. A Tx module (e.g., the Txn module 243 of FIG. 2) of the second Tx/Rx module may include a quadrature up converter 450. The quadrature down converters 420, 423, 440 and 443 and the quadrature up converters 430 and 450 may each have a quadrature frequency converter structure capable of processing in-phase and quadrature-phase signals.

According to various embodiments, the quadrature up converter 430 may increase the frequency of a transmission signal by a local oscillation signal (e.g., a transmission carrier frequency) TXLO1 (Tx local oscillator 1) of a first band. The first quadrature down converter 420 may lower the frequency of a reception signal by a local oscillation signal (e.g., a reception carrier frequency) RXLO1 (Rx local oscillator 1) of the first band. The second quadrature down converter 423 may lower the frequency of the reception signal by the local oscillation signal (e.g., the transmission carrier frequency) TXLO1 (Tx local oscillator 1) of the first band. The second quadrature down converter 423 may use the carrier frequency TXLO1 of the transmission band in order to feedback the transmission power of the RF signal transmitted by the frequency up conversion by the quadrature up converter 430.

According to various embodiments, the quadrature up converter 450 may increase the frequency of the transmission signal by a local oscillation signal (e.g., a transmission carrier frequency) TXLO2 of a second band. The first quadrature down converter 440 may lower the frequency of the reception signal by the local oscillation signal (e.g., a reception carrier frequency) TXLO2 of the second band. The second quadrature down converter 443 may lower the frequency of the reception signal by the local oscillation signal TXLO2 of the second band. The second quadrature down converter 443 may use the carrier frequency TXLO2 of the transmission band to feedback the transmission power of the RF signal transmitted by the frequency up conversion by the quadrature up converter 450.

According to various embodiments, the quadrature up converters 430 and 450 may be activated by the TX path selection of the processor 200. Each of the first quadrature down converters 420 and 440 may receive an RF signal received through the Rx path of the corresponding band. The first quadrature down converters 420 and 440 may receive response signals according to processing of a RACH signal from a network (e.g., a base station). If there is no response for a specific time, the processor 200 may process the corresponding RACH as a RACH error. The second quadrature down converters 423 and 443 may input a feedback (feedback Rx (FBRx)) of the Tx path transmission power of the corresponding band. The processor 200 may analyze a difference between target transmission power and actual transmission power received through the second quadrature down converters 423 and 443, and may process as a transmission error if the difference is out of a reference value range.

According to various embodiments, signals received through the quadrature down converters 420, 440, 423, 443 (Rx path (Rx, FBRx)) may be converted to digital data through an analog to digital converter (ADC) 460, and may be transmitted to the processor 200 through a front-end module 465. The processor 200 may perform an operation of selecting a Tx path suitable for each band, based on received data.

According to various embodiments, if the components of the Tx module (e.g., PA, Switch, RFIC, PLL, etc.) are in an abnormal state (e.g., failure or breakage), deviation may occur between the target transmission power of the processor 200 and the power transmitted from the Tx module. For example, the target transmission power (expect Tx power) of the processor 200 may be 23 dBm, and the transmission power transmitted from the abnormal Tx module may be −10 dBm. When an error occurs in a component of the Tx module, there may be a big difference between the transmit power (feedback Rx (FBRx) power) measured through the second quadrature down converters 423 or 443 of the Tx module and the target transmission power (target TX power, expect Tx power). In addition, the base station device might not be able to receive the signal transmitted from the electronic device, and thus RACH error (fail) may continuously occur.

In an embodiment, the processor 200 may transmit radio signals through a default Tx module (e.g., the Tx1 module 233 of FIG. 2) and receive radio signals through a default Rx module (e.g., the Rx1 module 235 of FIG. 2), and a sub Tx module (e.g., the Txn module 243 of FIG. 2) and a sub Rx module (e.g., the Rxn module 245 of FIG. 2) may maintain an inactivated states. The processor 200 may monitor the state of the default Tx module in operation. The processor 200 may compare and analyze the target transmission power and the actual transmission power transmitted from the Tx module to identify a transmission error. The processor 200 may read the USID of the Tx module through the MIPI bus (e.g., the MIPI bus 210 of FIG. 2), and identify an error of the component (component fail) when it is not possible to read the USID from the components of the Tx module. After transmitting the RACH data, the processor 200 may identify the RACH error when a response message is not received from the network.

According to various embodiments, the processor 200 may count the number of times a transmission power error, a component error, and/or a RACH error occurs, stop the operation of the default Tx module in operation when the count value exceeds a configured number, and store the errors of the default Tx module and the component in which the error has occurred. The processor 200 may stop the operation of the default Tx module and activate a sub Tx/Rx module.

In an embodiment, when a transmission power error occurs, the processor 200 may identify and store the component in which the error has occurred from the Tx module. The processor 200 may count the number of occurrences of the transmission power error and, if the number of times exceeds the configured number, configure the Tx/Rx module as an abnormal module (store as an abnormal state), and activate another Tx/Rx module to perform the operation.

In an embodiment, when a RACH error occurs, the processor 200 may identify and store the component in which the error has occurred from the Tx module. The processor 200 may count the number of occurrences of the RACH error and, if the number of times exceeds the configured number, configure the Tx/Rx module as an abnormal module, and activate another Tx/Rx module to perform the operation.

In an embodiment, when a RACH error occurs, the processor 200 may measure the transmission power of the Tx module. When the transmission power error occurs, the processor 200 may identify and store the component in which the error has occurred from the Tx module. The processor 200 may count the number of occurrences of the transmission power error and, if the number of times exceeds the configured number, configure the Tx/Rx module as an abnormal module, and activate another Tx/Rx module to perform the operation.

According to various embodiments, the electronic device (e.g., the electronic device 101) may include a transmission module including a first transmission module (e.g., the Tx1 module 233) and a second transmission module (e.g., the Txn module 243), and a processor (e.g., the processor 200). The processor may be configured to: receive a feedback of a first transmission power of the first transmission module, calculate a first difference value between a first target transmission power and the first transmission power of the first transmission module, determine the state of the first transmission module, based on the first difference value, and turn off the transmission operation of the first transmission module and activate the transmission operation of the second transmission module, upon determining that the state of the first transmission module is an abnormal state.

According to various embodiments, the electronic device may further include a memory (e.g., the memory 130), and the processor may be configured to: request unique slave IDs (USIDs) of the components of the transmission module from the respective component, determine a component that does not respond to the request among the components as a component in which an error has occurred, and store information on the component determined to have the error in the memory.

According to various embodiments, the processor is configured to transmit identification information of the electronic device and information on the component determined to have the error to a server.

According to various embodiments, the electronic device may further include a first reception module (e.g., the Rx1 module 235) corresponding to the first transmission module, and the processor may be configured to: transmit random access channel (RACH) information to a base station through the first transmission module; and calculate the first difference value between the first target transmission power and the first transmission power, when the response information of the RACH information is not received from the base station through a first reception module within a specified time.

According to various embodiments, the processor may be configured to: receive a feedback of a second transmission power of the second transmission module, calculate a second difference value between a second target transmission power and the second transmission power of the second transmission module, and turn off the transmission operation of the second transmission module when the second difference value exceeds a reference range.

According to various embodiments, the electronic device may further include a memory (e.g., the memory 130), a first reception module (e.g., the Rx1 module 235) corresponding to the first transmission module, and a second reception module (e.g., the Rxn module 245) corresponding to the second transmission module, and the processor may be configured to: transmit random access channel (RACH) information to a base station through an activated transmission module among the first transmission module and the second transmission module; calculate a difference value between a target transmission power of the activated transmission module and a transmission power when the response information of the RACH information is not received from the base station within a designated time through a reception module corresponding to the activated transmission module among the first reception module and the second reception module; count the number of transmission errors in which the difference value is out of the reference range; determine the state of the activated transmission module as an abnormal state when the number of transmission errors exceeds a configured value; and store information on the abnormal transmission module in the memory.

According to various embodiments, the processor may be configured to: determine the state of the first transmission module during the initial operation; and activate the second transmission module when the state of the first transmission module is abnormal.

According to various embodiments, an electronic device (e.g., the electronic device 101) may include a housing, a first antenna located inside the housing or being a part of the housing, a second antenna located inside the housing or being a part of the housing, a first transceiver (e.g., the Tx/Rx module 230) electrically connected to the first antenna, a second transceiver (e.g., the Tx/Rx module 240) electrically connected to the second antenna, and a control circuit (e.g., the processor 200) operatively connected to the first transceiver and the second transceiver. The control circuit may be configured to: transmit a first signal using the first transceiver and the second transceiver to a first network using carrier aggregation as a first operation, transmit a first signal using the first transceiver to a first network, measure a transmission strength of the first signal using the first transceiver, and transmit a second signal using the second transceiver to the first network while the first transceiver is deactivated, based at least on part on the measured transmission strength, as a second operation.

According to various embodiments, the control circuit may determine whether there is a random access channel (RACH) error.

According to various embodiments, the control circuit may transmit a second signal using the second transceiver, based on the determination as to whether the RACH error exists.

According to various embodiments, an electronic device (e.g., the electronic device 101) may include a housing, a first antenna located inside the housing or being a part of the housing, a second antenna located inside the housing or being a part of the housing, a first transceiver (e.g., the Tx/Rx module 230) electrically connected to the first antenna, a second transceiver (e.g., the Tx/Rx module 240) electrically connected to the second antenna, and a control circuit (e.g., the processor 200) operatively connected to the first transceiver and the second transceiver. The control circuit may transmit a first signal using the first transceiver and the second transceiver to a first network using carrier aggregation as a first operation, transmit a first signal using the first transceiver to the first network, determine whether a response is received from the first network, and transmit a second signal using the second transceiver to the first network, based on the determination as to whether to receive the response, as a second operation.

According to various embodiments, the control circuit may determine whether to receive the response according to whether there is a random access channel (RACH) error.

Figure 5:
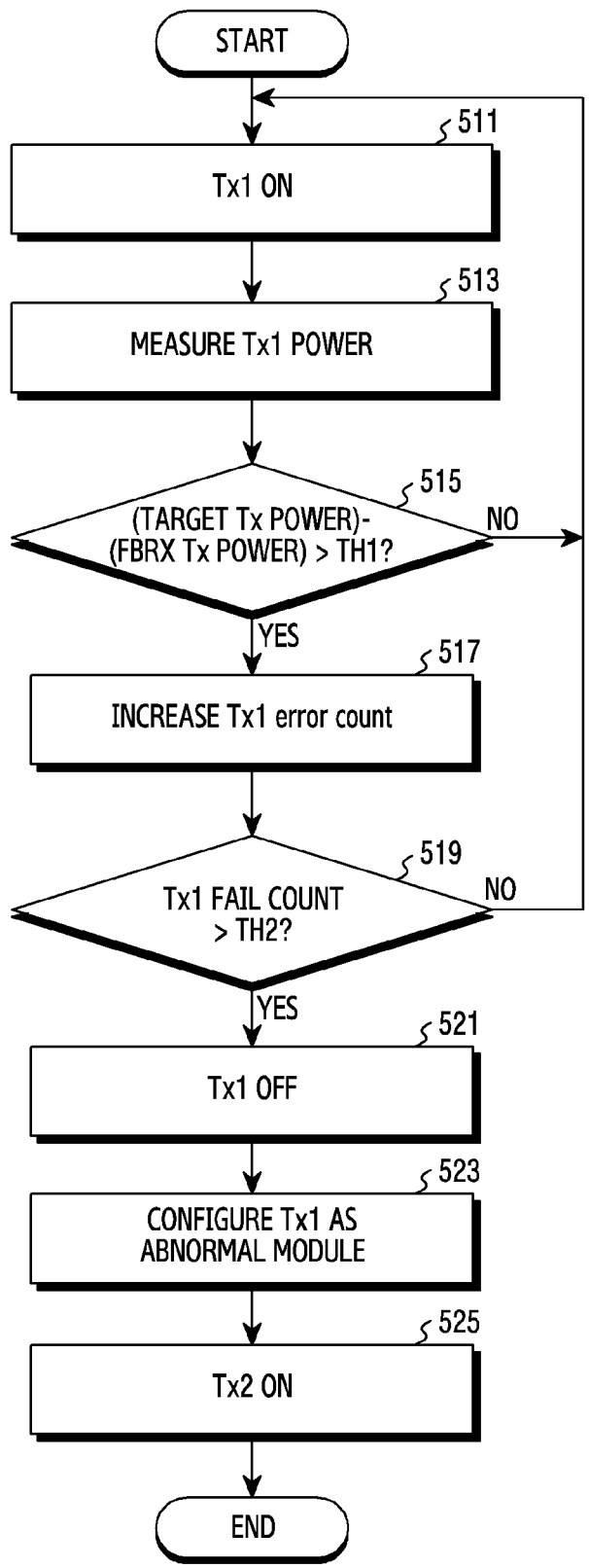
FIG. 5 is a flowchart illustrating a procedure for controlling a transmission operation of an electronic device according to various embodiments.

FIG. 5 is a flowchart illustrating a procedure for controlling a transmission operation of an electronic device according to various embodiments.

Operations 511 to 525 according to various embodiments may be understood as operations performed by a processor (e.g., the auxiliary processor 123 of FIG. 1, the processor 200 of FIG. 2) of an electronic device (e.g., the electronic device 101 of FIG. 1).

Referring to FIG. 5, in operation 511, the processor according to an embodiment may activate a first Tx module (e.g., the first Tx/Rx module 230 of FIG. 2). The first Tx/Rx module may be a default Tx/Rx module. When the first Tx/Rx module is activated, the processor may activate (turn on) the first Tx module (e.g., the Tx1 module 233 of FIG. 2) of the first Tx/Rx module to perform a transmission operation.

According to various embodiments, in operation 513, the processor may measure the transmission power of the first Tx module. For example, the processor may measure the transmission power of the first Tx module (e.g., the Tx1 module 233 of FIG. 2) received through an Rx module (e.g., the second quadrature down converter 423 of FIG. 4).

According to various embodiments, in operation 515, the processor may calculate a difference value between a target transmission power value of the first Tx module and a measured actual transmission power value of the first Tx module ((target(expect) Tx Power)−(FBRX Tx Power)), and compare the difference value of the two transmission power values with a configured reference value Th1. When the difference value between the two power values does not exceed the configured reference value Th1 ((target(expect) Tx Power)−(FBRX Tx Power)≤Th1), the processor may perform operation 511.

According to various embodiments, when the difference value between the two power values exceeds the configured reference value Th1 ((target(expect) Tx Power)−(FBRX Tx Power)>Th1), in operation 517, the processor may increase a transmission error count (TX1 fail count increment).

According to various embodiments, in operation 519, the processor may compare the transmission error count value of the first Tx module with a configured reference value Th2. If the transmission error count value does not exceed the configured reference value Th2 (TX1 fail count≤Th2), the processor may perform the operation of operation 511.

According to various embodiments, when the transmission error count value exceeds the configured reference value Th2 (TX1 fail count>Th2), in operation 521, the processor may turn off the operations of the first Tx/Rx module. In operation 523, the state of the first Tx/Rx module may be configured and stored as an abnormal state. The processor may read the USIDs of the components of the Tx module, determine a component whose USID is not read as an error component, and store information on the faulty component. The processor may determine the band in which the RACH error occurs as an error band, and store information on the error band. In operation 525, the processor may perform the Tx operation by activating the second Tx/Rx module in an operating state. When connected to a server, the processor may transmit error information of the first Tx module and information about an error-generated component to the server.

Figure 6:
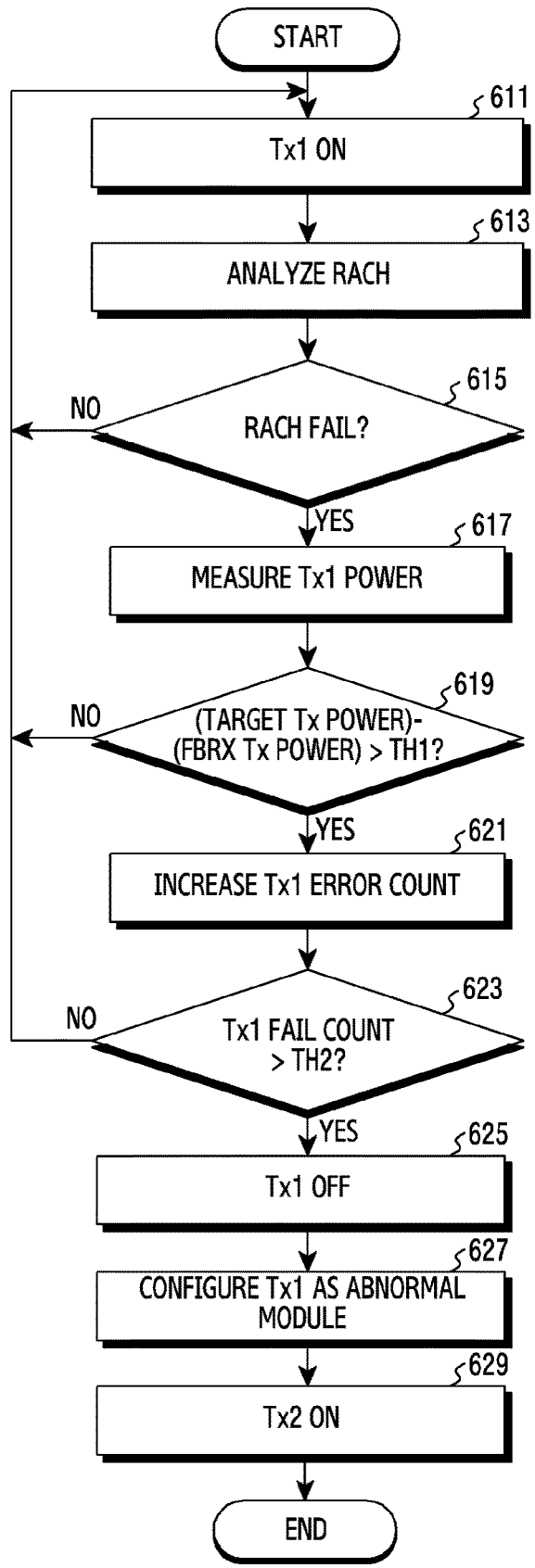
FIG. 6 is a flowchart illustrating a procedure for controlling a transmission operation of an electronic device according to various embodiments.

FIG. 6 is a flowchart illustrating a procedure for controlling a transmission operation of an electronic device according to various embodiments.

In various embodiments, operations 611 to 629 may be understood as operations performed by a processor (e.g., the auxiliary processor 123 of FIG. 1, the processor 200 of FIG. 2) of an electronic device (e.g., the electronic device 101 of FIG. 1).

Referring to FIG. 6, in operation 611, the processor of the electronic device according to various embodiments may activate a first Tx/Rx module (e.g., the Tx/Rx module 230 of FIG. 2). The first Tx/Rx module may be a default Tx/Rx module. When the first Tx/Rx module is activated, a first Tx module (e.g., the Tx1 module 233 of FIG. 2) of the first Tx/Rx module may be turned on to perform an Tx operation.

According to various embodiments, in operation 613, the processor may analyze a RACH response signal received through a first Rx module of the first Tx/Rx module. The RACH signal may be transmitted to the base station through the first Tx module, and the base station may transmit a response message corresponding to the received RACH signal. When the base station does not receive the RACH signal, the base station may not be able to transmit the RACH response message to the electronic device.

According to various embodiments, the processor may transmit RACH data and wait for reception of a RACH response message. In operation 615, if the processor does not receive the RACH response message within a configured time after transmitting the RACH data, the processor may identify (determine) the corresponding RACH as a RACH error. When the processor receives the RACH response message but a failure occurs, the processor may determine that the Tx module has been normally operated. For example, when the Radio Resource Control(RRC) connection reject message is received (e.g., for reasons such as the inability to allocate resources in the base station), the processor may identify that the Tx module is operating normally and retry RACH transmission when the timer expires. When the RACH response message is not received for a predetermined period of time after transmitting the RACH message, the processor may determine the corresponding RACH as a RACH fail.

According to various embodiments, when the RACH response message is received within a configured time after transmitting the RACH data, in operation 615, the processor may recognize the reception of the RACH response message and perform the operation 611.

According to various embodiments, when the processor recognizes the occurrence of the RACH error, the processor may measure the transmission power of the first Tx/Rx module in operation 617. For example, the processor may measure the transmission power of the first Tx module (e.g., the Tx1 module 233 of FIG. 2) received through the Rx module (e.g., the second quadrature down converter 423 of FIG. 4). The processor may calculate a difference value between the target transmission power value of the first Tx module and the measured actual transmission power value of the first Tx module (e.g., (target(expect) Tx Power)−(FBRX Tx Power)), and if the difference value between the two powers does not exceed the configured reference value Th1 (e.g., (target(expect) Tx Power)−(FBRX Tx Power) ≤Th1), the processor may perform operation 611.

According to various embodiments, if the difference between the two powers exceeds the configured reference value Th1 (e.g., (target(expect) Tx Power)−(FBRX Tx Power)>Th1), the processor may recognize that the difference between the two powers exceeds the configured reference value Th1 in operation 619, and increase the number of transmission errors (TX1 fail count increment) in operation 621. In operation 623, If the transmission error count value does not exceed the configured reference value Th2 (e.g., TX1 fail count≤Th2), the processor may perform operation 611.

According to various embodiments, in operation 623, if the transmit error count value exceeds a configured reference value Th2 (for example, TX1 fail count>Th2), in operation 625, the processor may turn off the operation of the first Tx/Rx module, and in operation 627, the processor may configure and store the state of the first Tx/Rx module as an abnormal state. The processor may read USIDs of the components of the Tx module, determine the components of the Tx module whose USIDs are not read as error components, and store information on the error components. The processor may determine the band in which the RACH error occurs as an error band, and store information on the error band.

According to various embodiments, the processor may delete a band supported by the turned off first Tx/Rx module from the supportable band list, transmit the band list to the network, or change and transmit configuration information to the network without ULCA support.

According to various embodiments, in operation 629, the processor may perform the Tx operation by activating a second Tx/Rx module (e.g., the Txn/Rxn module 240 of FIG. 2) in an operating state. The processor may control transmission of the second Tx/Rx module by analyzing the operation state of the second Tx/Rx module.

According to various embodiments, operations after operation 629 may be performed in the same manner as operations 611 to 627. When a transmission error of the second Tx/Rx module is identified, the processor may determine the state of the second Tx/Rx module as an error state, store information on the error state, and stop a communication operation. For example, when an error occurs in the second Tx/Rx module, the first Tx/Rx module is also in an error state, and the electronic device may terminate the communication function. According to various embodiments, an electronic device including at least two Tx/Rx modules may perform a Tx/Rx function using one Tx/Rx module (e.g., standalone), and may perform a Tx/Rx function using a plurality of Tx/Rx modules (e.g., uplink carrier aggregation (ULCA)). When a transmission error occurs when using one Tx/Rx module, the processor may use a different path from Tx1 to Txn and place only the priority back. For example, if the priority is configured in the order of bands B1, B2, B3, B4, and the currently available path is TX1 for B1, TX2 for B2, TX1 for B3, TX3 for B4, the processor may configure the priority of the band in the order of B1-B3 (B2 is TX2, so move backward)-B2 (B4 is TX3, so move back)-B4.

According to various embodiments, when an error occurs when using a plurality of Tx/Rx modules, the processor may analyze the path by using the next Tx path of the Tx path in which the transmission error has occurred (path conflict check). As a result of analyzing the Tx path, if ULCA is possible, the corresponding Tx path can be used. If ULCA is not possible, standalone manner can be used, based on a primary component carrier (PCC).

According to various embodiments, when an error occurs in the Tx module (e.g., the $n^{th}$ Tx module) of a specific band, the processor may delete only the part with the Tx module (e.g., the $n^{th}$ TX module) in which the error occurred in the ULCA (e.g., inter band ULCA) from the Tx-capable band (the corresponding combination is not supported by ULCA) and transfer the same to the base station. If a problem occurs in the Tx modules of all bands, the processor may transfer to the base station by switching to non-ULCA support.

Figure 7:
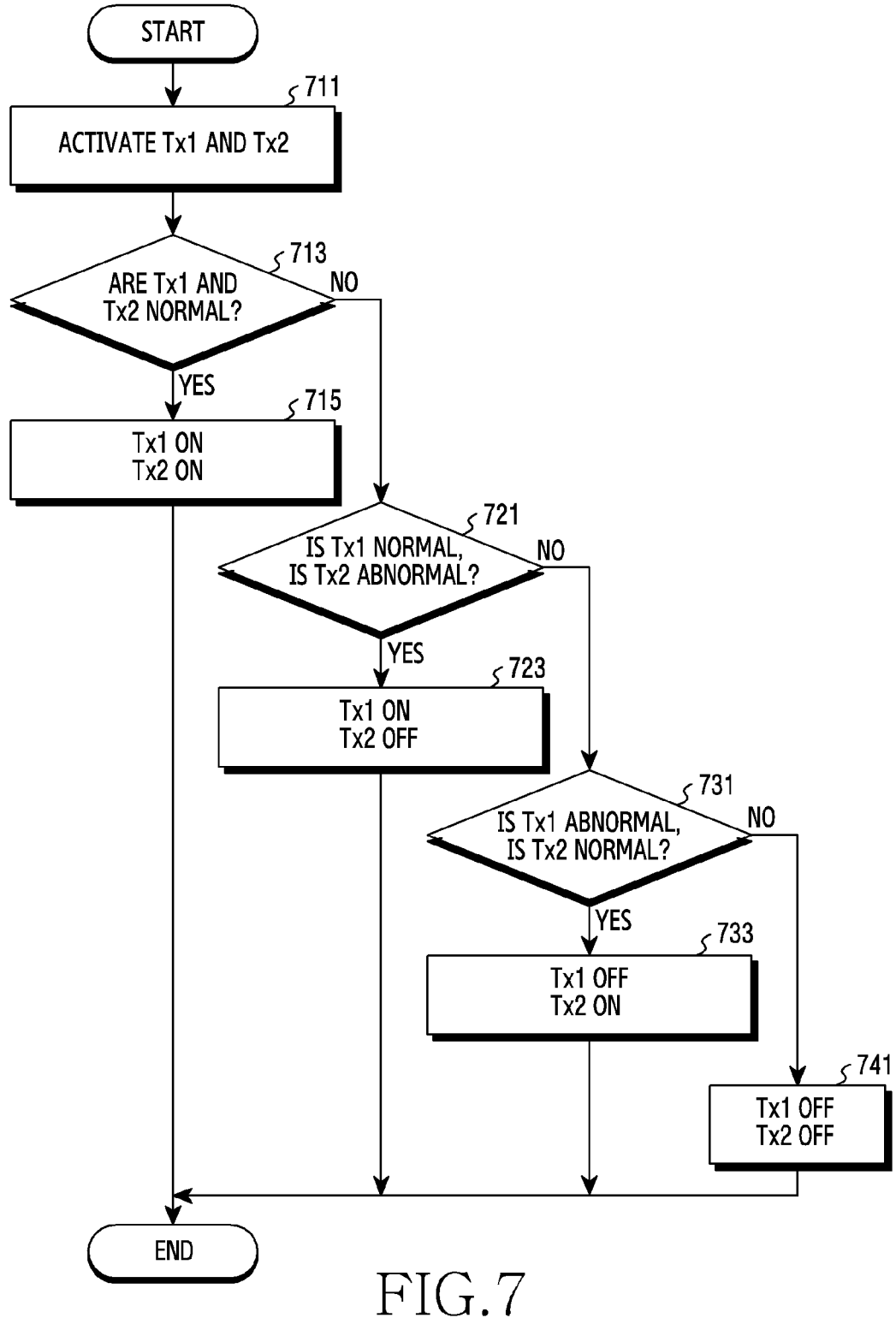
FIG. 7 is a flowchart illustrating a wireless communication control operation of an electronic device according to various embodiments.

FIG. 7 is a flowchart illustrating a wireless communication control operation of an electronic device according to various embodiments. FIG. 7 may be a flowchart illustrating an example of an operation of a ULCA Tx operation (e.g., a ULCA Tx fail operation).

Operations 711 to 741 according to various embodiments may be understood as operations performed by a processor (e.g., the auxiliary processor 123 of FIG. 1, the processor 200 of FIG. 2) of an electronic device (e.g., the electronic device 101 of FIG. 1). Referring to FIG. 7, in operation 711, the processor of the electronic device may perform a wireless communication function using a plurality of Tx/Rx modules. For example, the activated Tx/Rx module may be a first Tx/Rx module (e.g., the Tx1/Rx1 module 230 in FIG. 2) and a second Tx/Rx module (e.g., the Txn/Rxn module 240 in FIG. 2). In operation 711, the processor may perform the Tx operation by activating the Tx1 module and the Tx2 module.

According to various embodiments, in operation 713, the processor may determine whether the Tx operations of the Tx1 module and the Tx2 module are normal by analyzing the operation states of the Tx1 module and the Tx2 module. Analysis of the operating states of the Tx1 module (e.g., the Tx1 module 233 in FIG. 2) and the Tx2 module (e.g., the Txn module 243 in FIG. 2) may be performed in the manner described in FIG. 5 or 6.

According to various embodiments, if the Tx operations of the Tx1 module and the Tx2 module are normal, the processor may perform the Tx operation using the Tx1 module and the Tx2 module in operation 715. In operation 715, the processor may perform the Tx operation, based on the ULCA method.

According to various embodiments, if the Tx operation of the Tx1 module is in a normal state and the Tx operation of the Tx2 module is determined to be abnormal, the processor recognizes it in operation 721, and perform the Tx operation using the Tx1 module and turn off the Tx operation of the Tx2 module in operation 723.

According to various embodiments, in operation 731, if the Tx operation of the Tx1 module is identified as abnormal and the Tx operation of the Tx2 module is identified as a normal state, in operation 733, the processor may turn off the Tx1 module and perform the Tx operation using the Tx2 module.

According to various embodiments, in operation 741, if the Tx operation of the Tx1 module and the Tx2 module is confirmed as abnormal, the processor may turn off the Tx1 module and the Tx2 module in operation 741.

According to various embodiments, in operation 723, operation 733, and operation 741, the processor may analyze the path (path conflict check) using another Tx path (the Tx path excluding the Tx1 module and the Tx2 module), and if there is another Tx path in which path collision does not occur, the processor may perform the Tx operation in the ULCA method using the corresponding Tx path. As a result of analyzing the Tx path, if ULCA is not possible, a standalone manner can be used based on a primary component carrier (PCC).

Figure 8:
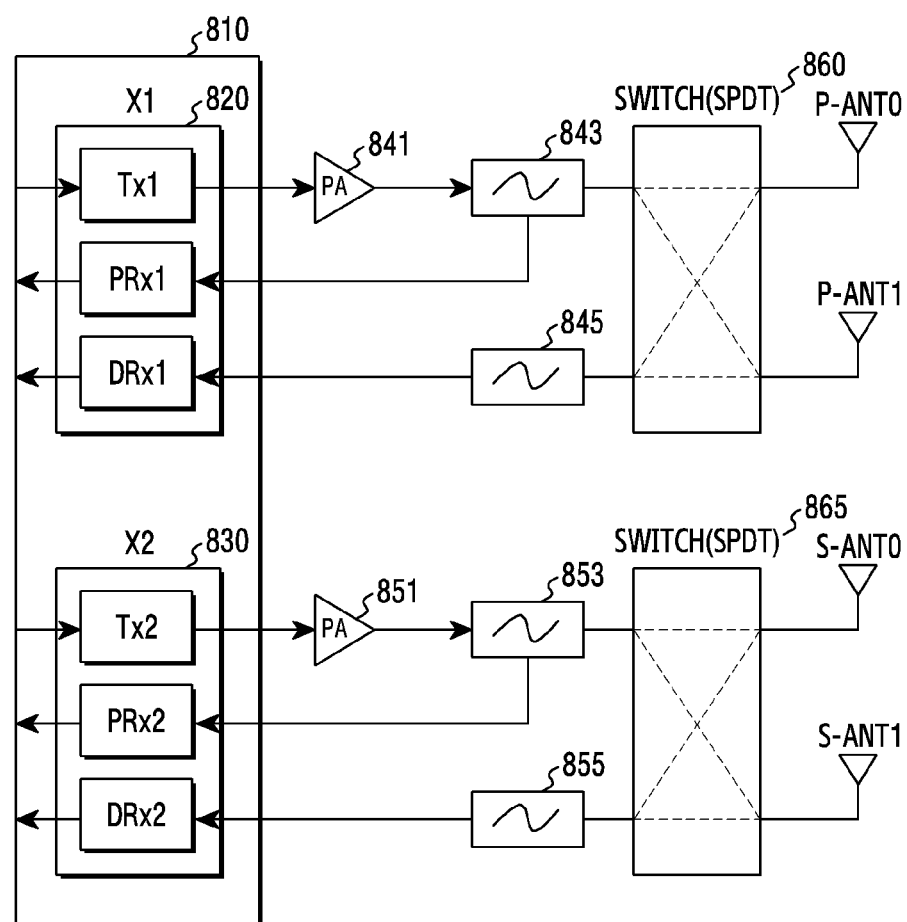
FIG. 8 is a diagram illustrating an operation of an electronic device supporting inter-band ULCA according to various embodiments.

FIG. 8 is a diagram illustrating an operation of an electronic device supporting inter-band ULCA according to various embodiments.

Referring to FIG. 8, an RFIC 810 may include a first RFIC 820 and a second RFIC 830. The first RFIC 820 and the second RFIC 830 may each have a configuration including digital components of a Tx/Rx module (e.g., the Tx1/Rx1 module 230 and Txn/Rxn module 240 of FIG. 2). The first RFIC 820 may include Tx1, PRx1, and DRx1, and the second RFIC 830 may include Tx2, PRx2, and DRx2.

According to various embodiments, a power amplifier 841 may amplify the power of a transmission signal of Tx1 of the first RFIC 820. A band filter 843 may be connected between the power amplifier 841 and a PRx1 and an antenna switch 860. A band filter 845 may be connected between the DRx1 and the antenna switch 860. The band filters 843 and 845 may filter the band signal of the first Tx/Rx module. The antenna switch 860 may be connected between the band filters 843 and 845, a primary antenna P-ANT0, and a diversity antenna P-ANT1.

According to various embodiments, the connection relationship between the analog components 851, 853, 855, 865, S-ANT0, and S-ANT1 connected to Tx2, PRx2, and DRx2 of the second RFIC 830 may be connected in the same way as the analog components 841, 843, 845, 860, P-ANT0, and P-ANT1 connected to the Tx1, PRx1, and DRx1 of the first RFIC 820.

According to various embodiments, the electronic device may use two transmission (Tx) paths (Tx1/Tx2) to support inter-band ULCA, and may use four RX paths (PRx1, DRx1, PRx2, DRx2) for Rx. The electronic device may perform a reception operation by selecting only Rx of a good electric field when a strong electric field condition is met. In a general Tx operation (e.g., a call operation), the electronic device may perform a Tx operation by selectively selecting a Tx1 module or a Tx2 module according to the electric field conditions of PRx1 and PRx2. In the case of inter-band ULCA, the electronic device may perform a Tx operation by simultaneously using Tx1 and Tx2.

According to various embodiments, the antenna switching algorithm of the electronic device may be operated based on reception levels of PRx and DRx. In the case of a terminal supporting 2Tx, since error information of each Tx path is not considered, it may not be possible to select another normal Tx path.

Figure 9:
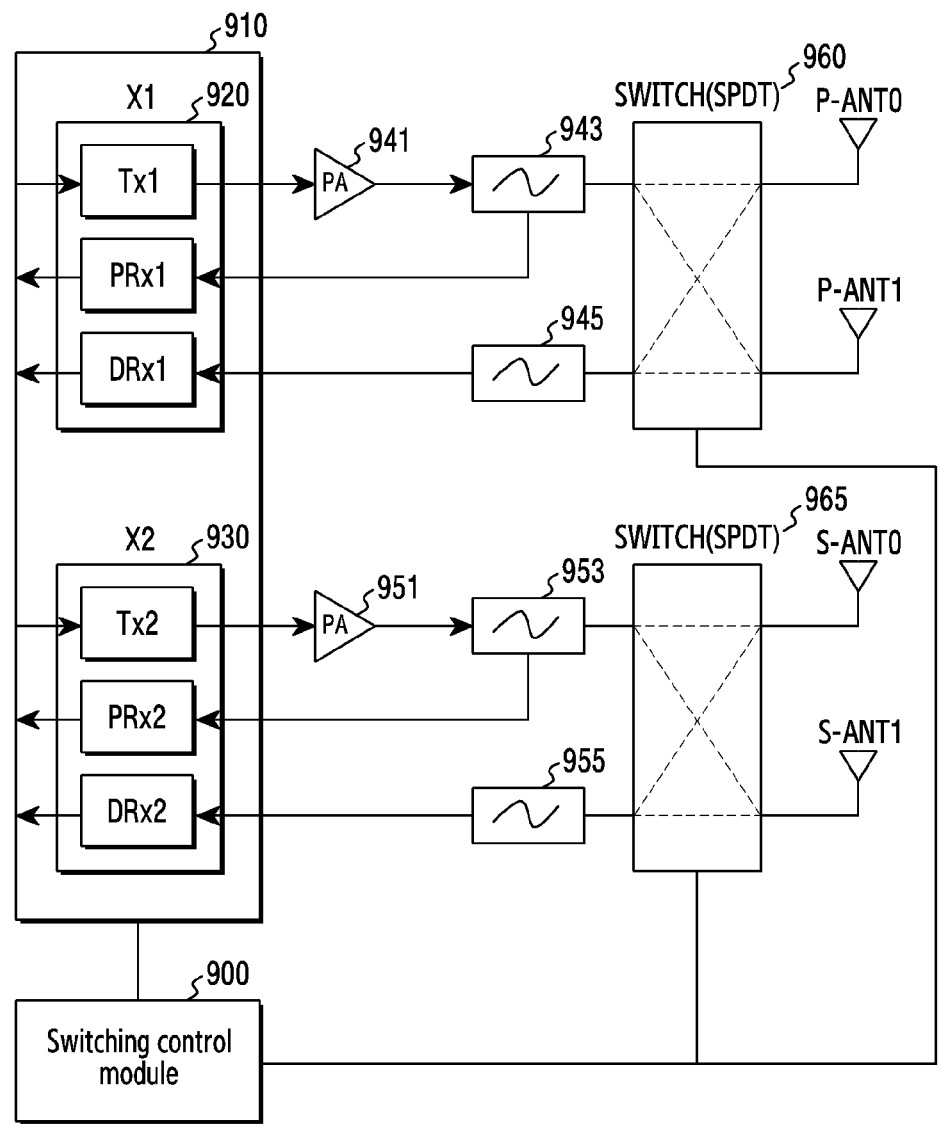
FIG. 9 is a diagram for describing a wireless transmission operation by an electronic device supporting inter-band ULCA according to various embodiments.

FIG. 9 is a diagram for describing a wireless transmission operation by an electronic device supporting inter-band ULCA according to various embodiments.

Referring to FIG. 9, an RFIC 910 may include a first RFIC 920 and a second RFIC 930. The first RFIC 920 and the second RFIC 930 may be configured to include digital components of the Tx/Rx module. The first RFIC 920 may include TX1, PRx1, and DRx1, and the second RFIC 930 may include Tx2, PRx2, and DRx2.

According to various embodiments, a power amplifier 941 may amplify the power of a transmission signal of Tx1 of the first RFIC 920. A band filter 943 may be connected between the power amplifier 941 and a PRx1 and an antenna switch 960. The band filter 945 may be connected between a DRx1 and the antenna switch 960. The band filters 943 and 945 may filter the band signals of the first Tx/Rx module. The antenna switch 960 may be connected between the band filters 943 and 945, a primary antenna P-ANT0, and a diversity antenna P-ANT1.

According to various embodiments, the connection relationship between the analog components 951, 953, 955, 965, S-ANT0, and S-ANT1 connected to Tx2, PRx2, and DRx2 of the second RFIC 930 may be made in the same way as the analog components 941, 943, 945, 960, P-ANT0, and P-ANT1 connected to the Tx1, PRx1, and DRx1 of the first RFIC 920.

According to various embodiments, the switching control module 900 may control the transmission operation of the Tx1 and Tx2 of the RFIC 910 and control the switching of the antenna switches 960 and 965 by the processor (e.g., the processor 200 of FIG. 2). The switching control module 900 may control switching of the antenna switches 960 and 965, based on the reception levels of the PRx and DRx. For example, when P-ANT0 signal attenuation or S-ANT0 signal attenuation occurs due to gripping or the like, the switching control module 900 may switch the ANT0/ANT1 of PRx/Tx and DRx to improve the Tx radiation gain.

According to various embodiments, the switching control module 900 may control the operation of Tx1 and/or Tx2, based on a difference value between the target Tx power of Tx1 and/or Tx2 being operated and the actually transmitted Tx power (FBRx power). When failure or breakage of the RFIC 910, power amplifiers 941, 951, or band filters 943 and 953 occurs, the target transmission power and the actual measured FBRx (Feedback Rx) power may have a greater difference than the configured reference value. If the difference between the two power values is greater than the set reference value, the network cannot receive the R Tx signal of the electronic device, and a RACH error may occur. When a RACH error occurs and the (target Tx power-FBRX Tx Power) value is greater than the configured reference value, the switching control module 900 may store information on the RACH fail band and information on the error RF component of the currently operating Tx1, and may control Tx Power to be normally transmitted by changing Tx2 having the next priority to a default Tx path.

Figure 10:
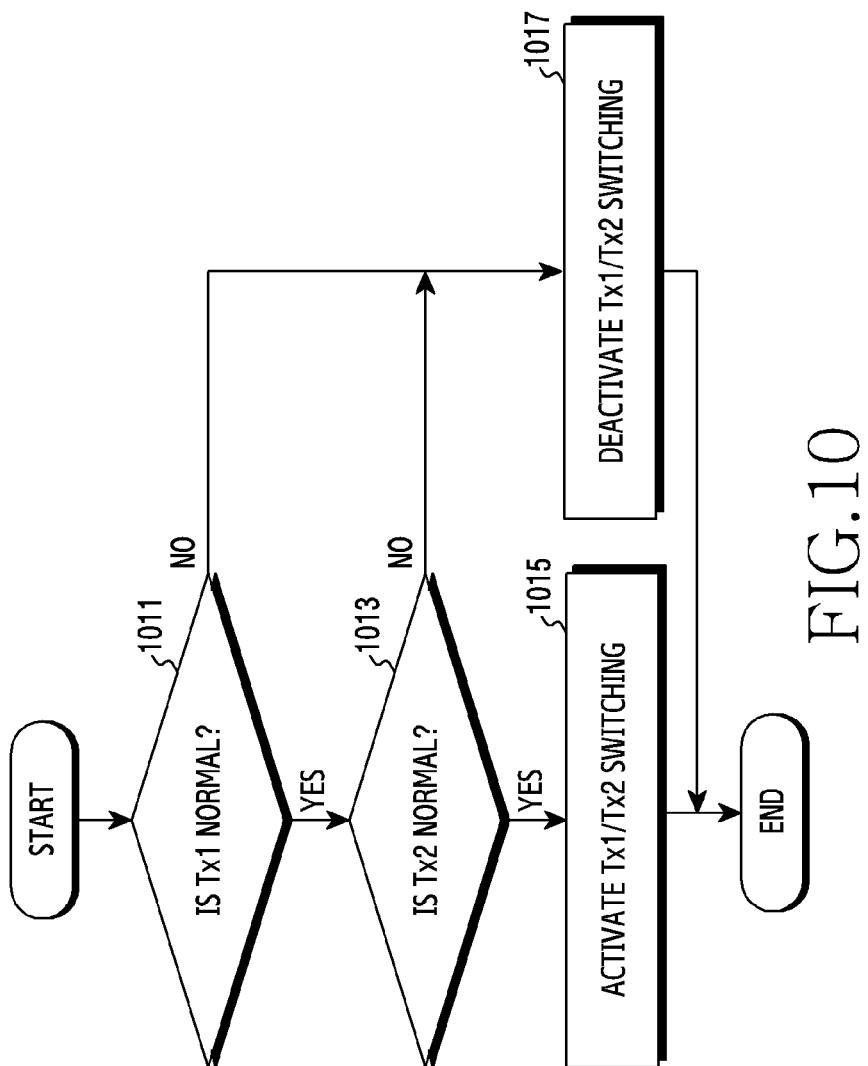
FIG. 10 is a flowchart illustrating an initialization operation procedure of an electronic device according to various embodiments.

FIG. 10 is a flowchart illustrating an initialization operation procedure of an electronic device according to various embodiments.

Operations 1011 to 1017 according to various embodiments may be understood as operations performed by a processor (e.g., the auxiliary processor 123 of FIG. 1, the processor 200 of FIG. 2) of an electronic device (e.g., the electronic device 101 of FIG. 1).

Referring to FIG. 10, the processor may identify the transmission error of the operating Tx module while performing the operations as shown in FIGS. 5, 6 and/or 7. Upon identifying the error of the Tx module, the processor may determine the corresponding Tx module as a faulty wireless module (defect Tx), and store the used band of the corresponding Tx module and information of the component in the Tx module in which the error has occurred.

According to various embodiments, when performing an RF initialization operation in operation 1011, the processor may identify the state of the Tx1 module (e.g., the Tx1 module 233 in FIG. 2), based on the stored error information, and in operation 1013, the processor may identify the state of the Tx2 module (e.g., the Txn module 243 of FIG. 2).

According to various embodiments, in operation 1015, if the processor determines that the Tx1 module and the Tx2 module are in a normal state, the processor may activate the Tx1/Tx2 switching. When the switching of Tx1/Tx2 is activated, the processor may switch the Tx module performing transmission operation to another Tx module, based on an error of the operating Tx module.

According to various embodiments, in operation 1017, if the state of the Tx1 module and/or the Tx2 module is abnormal, the processor may turn off the Tx module in an error state and configure the Tx module in a normal state as a default Tx module.

According to various embodiments, a method for controlling transmission of an electronic device may include: activating a transmission operation of a first transmission module in a transmission module including the first transmission module and a second transmission module; receiving a feedback of a first transmission power of the first transmission module; calculating a first difference value between a first target transmission power and the first transmission power of the first transmission module, determining the state of the first transmission module, based on the first difference value, and turning off the transmission operation of the first transmission module and activating the transmission operation of the second transmission module, upon determining that the state of the first transmission module is an abnormal state.

According to various embodiments, the operation of determining the state of the first transmission module may include requesting unique slave IDs (USIDs) of the respective components to each component of the first transmission module, and determining a component that does not respond to the request among the components as an error component of the first transmission module.

According to various embodiments, the method for controlling transmission may further include transmitting identification information of the electronic device and information on a component determined to have the error to a server.

According to various embodiments, the method for controlling transmission may further include transmitting random access channel (RACH) information to the base station through the first transmission module, and calculating the first difference value between the first target transmission power and the first transmission power if the response information of the RACH information is not received from the base station through the first reception module corresponding to the first transmission module within a specified time.

According to various embodiments, the method for controlling transmission may further include: receiving a feedback of a second transmission power of the second transmission module if the transmission operation of the second transmission module is activated; calculating a second difference value between a second target transmission power and the second transmission power of the second transmission module; and turning off the transmission operation of the second transmission module if the second difference value exceeds a reference range.

According to various embodiments, the method for controlling transmission may further include: transmitting random access channel (RACH) information to a base station through an activated transmission module among the first transmission module and the second transmission module; calculating the difference value between the target transmission power of the activated transmission module and the transmission power, if the response information of the RACH information is not received from the base station through a reception module corresponding to the activated transmission module among the first reception module corresponding to the first transmission module and the second reception module corresponding to the second transmission module within a designated time; counting the number of transmission errors in which the difference value is out of the reference range; and determining the state of the activated transmission module as an abnormal state when the number of transmission errors exceeds a configures value.

According to various embodiments, the operation of determining the state of the activated transmission module as an abnormal state may further include: requesting unique slave IDs (USIDs) of the components of the activated transmission module from the respective component; determining a component that does not respond to the request among the components as an error component of the activated transmission module; and transmitting identification information of the electronic device and information on a component determined to have the error to the server.

According to various embodiments, the method for controlling transmission may further include: determining the state of the first transmission module during the initial operation; and activating the second transmission module when the state of the first transmission module is an abnormal state.

According to various embodiments, a method for controlling transmission of an electronic device supporting inter-band uplink carrier aggregation (ULCA) may include: activating the transmission operations of a first transmission module and a second transmission module; identifying a transmission error of the first transmission module and the second transmission module; and determining the transmission module in which the transmission error has occurred as an error transmission module and turning off the operation of the error transmission module. The operation of identifying the transmission error may include: identifying a random access channel (RACH) response error of the transmission module; calculating a difference value between a target transmission power and an actual transmission power if the RACH response error is identified; and determining the transmission module as an error transmission module if the calculated difference value exceeds a reference value.

According to various embodiments, the operation of identifying as the error transmission module may further include: requesting a response of unique slave IDs (USIDs) of the respective components of the transmission module; and determining a component that does not respond to the request as an abnormal component of an abnormal transmission module.

According to various embodiments, the operation of turning off the operation of the error transmission module may further include transmitting identification information of the electronic device and information on the error component to a server.

According to various embodiments, the method for controlling transmission of an electronic device supporting inter-band ULCA may further include identifying whether the first transmission module and the second transmission module are abnormal when the transmission module is initialized, and turning off the transmission operation of the corresponding transmission module if there is an abnormal transmission module.

What is claimed is:

1. An electronic device comprising:
   at least one antenna;
   a first transceiver for a first frequency band, wherein the first transceiver is electrically connected with the at least one antenna;
   a second transceiver;
   at least one processor; and
   memory storing instructions that, when executed by the at least one processor individually or collectively, cause the electronic device to:
   compare a target transmission power value configured for the first transceiver and a transmission power value of a signal transmitted via the first transceiver, in case that a difference value between the target transmission power value and the transmission power value exceeds a reference range, identify the first frequency band associated with the first transceiver, and transmit, to a base station via the second transceiver, information on a frequency band list including frequency bands supported by the electronic device, wherein the first frequency band is deleted in the frequency bands of the frequency band list.

2. The electronic device of claim 1, wherein the instructions, when executed by the at least one processor individually or collectively, cause the electronic device to:

transmit signals of the first frequency band via the second transceiver by switching a transceiver for the first frequency band from the first transceiver to the second transceiver.

3. The electronic device of claim 1, wherein the instructions, when executed by the at least one processor individually or collectively, cause the electronic device to:

in case that the difference value exceeds the reference range, identify the first transceiver as a transceiver in which an error occurs, store information on the first transceiver in which the error occurs, and determine the first frequency band associated with the first transceiver as an error band.

4. The electronic device of claim 3, wherein change the frequency band list including the frequency bands supported by the electronic device is changed based on determining that the first frequency band is the error band.

5. The electronic device of claim 1, wherein the information includes information for indicating that a combination of frequency bands including the first frequency band is not supported for uplink carrier aggregation (ULCA).

6. The electronic device of claim 1, wherein the instructions, when executed by the at least one processor individually or collectively, cause the electronic device to:

transmit, to the base station, capability information including a priority table for available transceivers, and determine to change a priority of the first frequency band to a lower priority.

7. The electronic device of claim 1, wherein components of the first transceiver are configured to receive, from the at least one processor, a request for unique slave identities (IDs) (USIDs) of the components of the first transceiver, and wherein a first component that does not respond to the request among the components is identified as a component in which an error occurs.

8. The electronic device of claim 7, wherein the at least one processor is configured to:

read the USIDs from the components of the first transceiver using a mobile industry processor interface (MIPI) bus, and in case that the at least one processor is not able to read an USID from the first component, determine the first component as the component in which the error occurs.

9. The electronic device of claim 1, wherein the first transceiver includes a first power amplifier (PA), and a first filter disposed between the first PA and the at least one antenna, and wherein the second transceiver includes a second PA, and a second filter disposed between the second PA and the at least one antenna.

10. The electronic device of claim 9, wherein the instructions, when executed by the at least one processor individually or collectively, cause the electronic device to:

deactivate the first transceiver by deactivating the first PA.

11. The electronic device of claim 1, wherein the instructions, when executed by the at least one processor individually or collectively, cause the electronic device to:

transmit, to the base station, a first message for a random access procedure via the first transceiver, and identify a random access channel (RACH) error has occurred in case that a second message which is a response to the first message is not received within a specified time.

12. The electronic device of claim 11, wherein the instructions, when executed by the at least one processor individually or collectively, cause the electronic device to:

identify a frequency band in which the RACH error has occurred as an error frequency band, wherein the frequency band is supported by the first transceiver, and change the frequency band list including the frequency bands supported by the electronic device based on the frequency band.

13. The electronic device of claim 1, wherein the instructions, when executed by the at least one processor individually or collectively, cause the electronic device to:

determine the target transmission power value configured for the first transceiver, identify a feedback of transmission power actually output via the first transceiver, the feedback being received from a first circuit measuring the transmission power value of the signal, and deactivate the first transceiver based on the feedback.

14. The electronic device of claim 1, further comprising:

a plurality of transceivers including the first transceiver for the first frequency band and the second transceiver for the first frequency band, wherein, in case that the first transceiver is identified as abnormal, the first frequency band supported by the second transceiver is deleted in the frequency bands of the frequency band list.

15. The electronic device of claim 1, wherein the first frequency band includes a frequency band for a long term evolution (LTE).

16. A method performed by an electronic device in a wireless communication, the method comprising:

comparing a target transmission power value configured for a first transceiver and a transmission power value of a signal transmitted via the first transceiver for a first frequency band;

in case that a difference value between the target transmission power value and the transmission power value exceeds a reference range, identifying the first frequency band associated with the first transceiver; and transmitting, to a base station via a second transceiver, information on a frequency band list including frequency bands supported by the electronic device, wherein the first frequency band is deleted in the frequency bands of the frequency band list.

17. The method of claim 16, further comprising:

in case that the difference value exceeds the reference range, identifying the first transceiver as a transceiver in which an error occurs, storing information on the first transceiver in which the error occurs, and determining the first frequency band associated with the first transceiver as an error band.

18. The method of claim 17, wherein
the frequency band list including the frequency bands supported by the electronic device is changed based on determining that the first frequency band is the error band.

19. The method of claim 16, wherein, in case that the first transceiver is identified as abnormal, the first frequency band supported by the second transceiver is deleted in the frequency bands of the frequency band list.

20. The method of claim 16, wherein the first frequency band includes a frequency band for a long term evolution (LTE).

* * * * *